(12) United States Patent
Hattori et al.

(10) Patent No.: US 8,522,932 B2
(45) Date of Patent: Sep. 3, 2013

(54) DISC BRAKE PAD

(75) Inventors: Yasuki Hattori, Oura-machi (JP);
Toshiya Takada, Oura-machi (JP)

(73) Assignee: Nisshinbo Brake Inc., Tokyo (JP)

( * ) Notice: Subject to any disclaimer, the term of this patent is extended or adjusted under 35 U.S.C. 154(b) by 155 days.

(21) Appl. No.: 13/090,055

(22) Filed: Apr. 19, 2011

(65) Prior Publication Data
US 2011/0259686 A1 Oct. 27, 2011

(30) Foreign Application Priority Data

Apr. 23, 2010 (JP) .................................. 2010-100090
Mar. 16, 2011 (JP) .................................. 2011-057954

(51) Int. Cl.
*F16D 69/00* (2006.01)

(52) U.S. Cl.
USPC .................... 188/255; 188/251 R; 188/251 A; 188/250 B

(58) Field of Classification Search
None
See application file for complete search history.

(56) References Cited

U.S. PATENT DOCUMENTS

| | | | | |
|---|---|---|---|---|
| 3,455,868 A * | 7/1969 | Alessandro | ................... | 523/158 |
| 3,655,609 A * | 4/1972 | Evans | ................ | 524/4 |
| 3,967,037 A * | 6/1976 | Marzocchi et al. | ........... | 428/392 |
| 6,140,388 A * | 10/2000 | Nass et al. | ..................... | 523/139 |
| 6,455,145 B1 * | 9/2002 | Mizuno et al. | ........... | 428/311.11 |
| 6,524,681 B1 * | 2/2003 | Seitz et al. | ..................... | 428/143 |
| 6,656,240 B2 * | 12/2003 | Chiba | ............................. | 51/307 |
| 7,097,009 B2 * | 8/2006 | Shao et al. | ................ | 188/251 A |
| 7,275,625 B2 * | 10/2007 | Oi et al. | ..................... | 188/250 B |
| 7,297,728 B2 * | 11/2007 | Yamamoto et al. | ........... | 523/149 |
| 8,151,433 B2 * | 4/2012 | Liu et al. | ..................... | 29/527.1 |
| 2006/0283673 A1 * | 12/2006 | Lamport | .................. | 188/251 R |
| 2009/0032343 A1 * | 2/2009 | Liu et al. | .................. | 188/250 B |

* cited by examiner

*Primary Examiner* — Thomas Irvin
(74) *Attorney, Agent, or Firm* — Tracy M. Heims; Apex Juris, pllc

(57) ABSTRACT

To provide a disc brake pad for a disc brake equipped with a metal disc rotor, having a friction material that includes a fiber base material, a binder, an abrasive material, and a frictional wear modifier, which effectively minimizes a sticking problem of the friction material and the disc rotor and simultaneously provides effective fading resistance, wear resistance, and formability. The friction material includes the fiber base material, binder, abrasive material, and frictional wear modifier, and friction material has the binder of 4.5-7.0 weight % relative to the gross friction material amount, aralkyl modified phenolic resin of at least 50 weight % relative to the binder amount, inorganic particles of 1-3 weight % as the abrasive material with 6-8 of Moh's hardness and average particle diameter of 10-200 μm. Furthermore, the friction material includes alkali metal titanate and/or alkali earth metal titanate of 20-30 weight %.

4 Claims, 1 Drawing Sheet

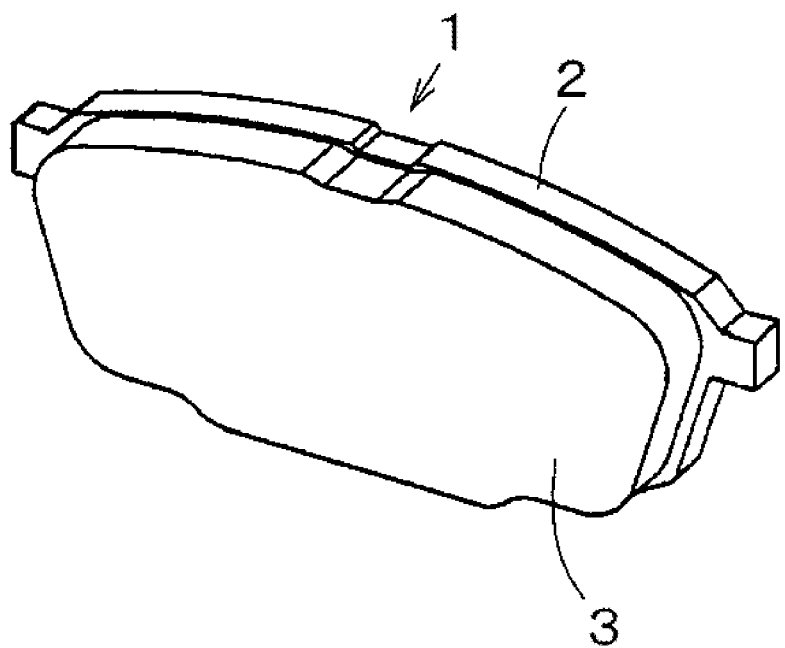

DISC BRAKE PAD

CROSS-REFERENCE TO RELATED APPLICATION(S) AND CLAIM OF PRIORITY

The present application claims the benefit under 35 U.S.C. section 119(a) of Japanese Patent Applications filed in the Japan Patent Office on Apr. 23, 2010 and assigned serial number 2010-100090 and on Mar. 16, 2011 and assigned serial number 2011-057954, the disclosure of which is incorporated herein by reference.

FIELD OF INVENTION

This invention relates to a disc brake pad used in an automotive disc brake, which has a friction material including a fiber base material, a binder, an abrasive material, and a frictional wear modifier.

BACKGROUND OF INVENTION

A disc brake is conventionally used for an automotive brake. The conventional disc brake uses a disc brake pad as a frictional member, where the friction material is affixed on a metal base member.

Japanese Provisional Patent Publication Number 2006-275198 (Patent Document 1) discloses the disc brake pad formed by affixing the friction material including the fiber base material, the binder, and the filler on a back plate, where the friction material has straight phenolic resin and phenol aralkyl resin as the binder in mass ratio of 85:15-65:35. This disc brake pad enables to maintain the durability under the high load conditions and to reduce brake noise, cracking around an end portion of junction between the friction material and the back plate, and peeling of the friction marital from the back plate.

Recently, in order to improve automotive fuel efficiency and operability, lightweight automotive components are in demand. To accomplish the goal of producing lightweight components, there are proposals to lower the density of materials used to make components and parts and to reduce the thickness and to minimize the component size, and particularly for brake components there is a demand to downsize brake system, especially the disc rotor.

Downsizing the disc rotor while maintaining brake efficiency and capacity at the same level without downsizing is required, and therefore the friction material on the disc pad used in combination with the disc rotor would have to bear greater loads due to the downsizing of the disc rotor. Accordingly, the friction material needs to have a higher fading resistance.

In order to improve the fading resistance of the friction material, in some cases, cryolite has been added to the friction material. However, the friction material with cryolite has a problem of sticking the friction material with the disc rotor when dissolving cryolite at a surface portion of the friction material when temperature of the friction material becomes high, and under this condition, if a tight contact between the friction material and disc rotor is maintained, as the friction material temperature falls, dissolved cryolite solidifies to adhere the friction material and the disc rotor.

Japanese Provisional Patent Publication No. 2009-132816 (Patent Document 2) discloses a non-asbestos friction material including a fiber base material, binder, lubricant, and other fillers, where the fillers at least contains calcium pyrophosphate. Furthermore, the Patent Document 2 discloses non-asbestos friction material including the above-mentioned calcium pyrophosphate of 4-6 volume % and cryolite of 3-5 volume % as the filler.

The sticking problem considered due to cryolite may be restricted effectively by the technology of the Patent Document 2; however, another sticking problem without cryolite became apparent.

Patent Document 1: Japanese Provisional Patent Publication No. 2009-132816. Patent Document 2: Japanese Provisional Patent Publication No. 2009-132816

SUMMARY OF INVENTION

An object of this invention is to provide a disc brake pad for a disc brake, equipped with a ferrous disc rotor, having a friction material that includes afiber base material, a binder, an abrasive material, and a frictional wear modifier, that limits the sticking problem of the friction material and the disc rotor effectively and at the same time provides effective fading resistance, wear resistance and formability.

The sticking problem of using the disc brake pad with the friction material without cryolite in the ferrous disc rotor is found to be caused according to the following mechanism.

Generally, an abrasive material is added to the friction material of the disc brake pad so as to improve the frictional coefficient. When the ferrous disc rotor is worn by the abrasive material, wear dust from the disc rotor is transferred onto the friction material surface and thus creates a ferrous transfer film on the friction material surface. Here, when the frictional temperature of braking creates a high friction surface temperature between the disc rotor and the friction material, a thermosetting resin, included as the binder of the friction material, causes thermal decomposition and the generation of an unwanted gas. This gas is generated when the friction material surface temperature reaches a combustion temperature. This combustion heats the ferrous transfer film formed on the friction material surface and significantly reduces the amount of oxygen around the friction surface. After the combustion, massive amounts of oxygen is introduced onto the friction surface to contact the heated ferrous transfer film on the friction material surface. As a result, the oxygen and the ferrous transfer film rapidly cause an oxidase reaction and generate ferrous oxide molten slag. Then, if the tight contact between the friction material and the disc rotor is maintained, as the friction material temperature falls, the dissolved ferrous oxide slag becomes solidified and causes the sticking problem.

Inventors of this invention studied the above-explained mechanism and found an effective solution of reducing the sticking problem of the ferrous disc rotor by (1) using a binder of a thermosetting resin with high heat resistance that generates less gas at high temperatures and (2) adjusting Moh's hardness of the abrasive material, average particle size of the abrasive material, and the amount of additional abrasive material.

This invention relates to the disc brake pad for the disc brake equipped with the ferrous disc rotor, having the friction material including the fiber base material, binder, abrasive material, and frictional wear modifier and is based on the following technology.

(1) A disc brake pad for a disc brake, equipped with a ferrous disc rotor, having a friction material comprised of: a fiber base material, a binder of 4.5-7.0 weight % relative to the gross friction material amount including aralkyl modified phenolic resin of at least 50 weight % relative to the binder amount, an abrasive material including inorganic particles of 1-3 weight % weight having Moh's hardness between 6 and 8 and average particle diameter of 10-200 μm, and a frictional wear modifier.

(2) The disc brake pad of the above (1), wherein the friction material further comprises alkali metal titanate and/or alkali earth metal titanate of 20-30 weight %.

(3) The disc brake pad of the above (1) or (2), wherein the friction material further comprises cashew dusts of 3-30 weight %.

This invention can provide the disc brake pad for the disc brake, equipped with the ferrous disc rotor, having the friction material that includes the fiber base material, binder, abrasive material, and frictional wear modifier, that minimizes the sticking problem of the friction material and the disc rotor effectively and at the same time provides effective fading resistance, wear resistance, and formability.

BRIEF DESCRIPTION OF THE DRAWINGS

The above and other objects of the present invention will become readily apparent by reference to the following detailed description when considered in conjunction with the accompanying drawings wherein:

FIG. 1 is a perspective view of the disc brake pad of this invention.

DETAILED DESCRIPTION OF THE PREFERRED EMBODIMENT

The friction material for the disc brake pad of this invention has the binder of 4.5-7.0 weight % relative to the gross amount of the friction material and aralkyl modified phenolic resin of at least 50 weight % relative to the gross amount of the binder. The gross amount of the binder is preferably 4.5-7.0 weight % relative to the gross amount of the friction material. If the gross amount of the binder is 4.5 weight % of the gross amount of the friction material, the wear resistance reduces while if the weight % exceeds 7.0, the fading resistance reduces. Aralkyl modified phenolic resin, which has high heat resistance, has an aralkyl base without a phenolic hydroxyl group between phenolic nuclei and phenolic nuclei. Including at least 50 weight % of the amount of aralkyl modified phenolic resin relative to the gross amount of the binder reduces the amount of generation gas under the high temperature and minimizes the sticking problem.

Other than aralkyl modified phenolic resin, the binder can be various thermosetting resins, such as phenolic resin, various elastomer modified phenolic resins as a result of modifying phenolic resin by such as cashew oil, silicon oil, and various elastomer, various elastomer dispersion phenolic resins as a result of dispersing various such as elastomer and fluorine polymer in phenolic resin, epoxy resin, and benzoxazine resin.

In order to realize good formability, the maximum amount of aralkyl modified phenolic resin relative to the gross amount of the binder should be 80 weight %, and the remaining part of the binder is preferably phenolic resin of 2,000-5,000 weight average molecular weight.

Also, the friction material for the disc brake pad of this invention has an abrasive material that is 1-3 weight % of inorganic particles with Moh's hardness of 6-8 and an average particle diameter of 10-200 μm.

The inorganic particles with Moh's hardness of less than 6 do not provide sufficient brake effectiveness and reduces the fading resistance while inorganic particles with Moh's hardness of more than 8 shows excessive aggressiveness against the mating surface, generating more disc rotor wear dust, which tends to create the sticking problem and increases the amount of disc rotor wear. Inorganic particles with Moh's hardness of 6-8 can be inorganic particles generally used for the friction material such as zirconium oxide, zirconium silicate or aluminum oxide.

Here, in the present invention, Moh's hardness is represented by 1. Talc, 2. Gypsum, 3. Calcite, 4. Fluorite, 5. Apatite, 6. Orthoclase, 7. Quartz, 8. Topaz, 9. Corundum, 10. Diamond.

Inorganic particles with an average particle diameter of less than 10 μm do not provide sufficient brake effectiveness and reduces the fading resistance while inorganic particles with an average particle diameter of more than 200 μm shows excessive aggressiveness against the mating surface, generating more disc rotor wear dust, which tends to create the sticking problem and increases the amount of disc rotor wear. Also, this invention uses a few 50% particle diameter as the average particle diameter measured by laser diffraction particle sizing method.

The inorganic particles with contents of less than 1 weight % does not provide sufficient brake effectiveness and reduces the fading resistance while the inorganic particles with contents of more than 3 weight % shows excessive aggressiveness against the mating surface, generating more disc rotor wear dust, which tends to create the sticking problem and increases the amount of disc rotor wear.

Preferably, the friction material of the brake pad of this invention further includes alkali metal titanate and/or alkali earth metal titanate salt of 20-30 weight %. Sufficient amount of alkali metal titanate and/or alkali earth metal titanate salt, which tends to form a transfer film on the disc rotor surface, is added to minimize the transfer of the wear dust from the disc rotor to the friction material surface to form the ferrous transfer film thereon, thereby providing the apparent effect of minimizing the sticking problem. Excessive amount of additional amount of alkali metal titanate and/or alkali earth metal titanate salt reduces the wear resistance.

This alkali metal titanate and/or alkali earth metal titanate are preferably flat or squamous shape, which tends to form a film on the disc rotor surface. Alkali metal titanate and/or alkali earth metal titanate can be potassium titanate, lithium potassium titanate, or potassium magnesium titanate, and are commonly used for the friction material.

Preferably, the friction material of the brake pad of this invention further includes cashew dusts of 3-5 weight %. Adding sufficient amounts of cashew dust that tend to be oxidized under high temperature prevents the oxidation of the ferrous ingredient transferred to the friction material surface, thereby providing significant reduction of the sticking phenomena. Excessive amounts of cashew dust reduces the fading resistant efficiency.

Also, the friction material of the brake pad of this invention, in addition to the above-mentioned binder, abrasive material, alkali metal titanate and/or alkali earth metal titanate, and cashew dust, further includes materials generally used in the frictional material, such as fiber base materials like metal fiber, organic fiber, and inorganic fiber and frictional wear modifier such as organic filler, inorganic filler, lubricant, and metal particles.

Examples of the fiber base materials are metal fibers such as steel fiber, stainless fiber, copper fiber, brass fiber, bronze fiber, aluminum fiber, and zinc fiber; organic fiber such as aramid fiber and acrylic fiber; and inorganic fiber such as carbon fiber, cellulose fiber, rock wool fiber, and potassium titanate fiber.

Examples of the frictional wear modifier are an organic filler such as rubber dust (a tire tread rubber pulverized powder); various unvulcanized rubber particles, various vulcanized rubber particles; an inorganic filler such as calcium carbonate, barium sulfate, calcium hydroxide, vermiculite, mica; a lubricant such as graphite, coke, molybdenum disulfide, tin sulfide, zinc sulfide, and ferric sulfide; and a metal particle such as copper, brass, zinc, and aluminum.

The fiber base material and the frictional wear modifier may be arranged in consideration of the desired quality, mechanical characteristics, and frictional wear characteristics.

The disc brake pad of this invention processes a group of the predetermined amount of the above-explained binder, abrasive material, alkali metal titanate and/or alkali earth metal titanate, cashew dust, fiber base material, and a frictional wear modifier through a mixing step using a mixer to uniformly combine and mix the group to make a frictional material mixture, a heat pressure forming step using a heat former in which the obtained frictional material mixture is superposed on a pre-cleaned, surface treated, adhesive coated metal back plate such as steel or iron to be positioned, a heat treatment step for heating to complete the curing reaction of the binder, and a grinding step to form a frictional surface. Additionally, a granulation step for granulating the frictional material mixture, and a pre-forming step for pressurizing the frictional material mixture of the resulted granulation after the granulation step to pre-form the same, may be included prior to the heat pressure forming step as necessary, and a coating step and a scorching step after the heat pressure forming step as necessary.

<Embodiment>

This invention will be explained in a concrete manner with actual embodiments and comparative examples; however, this invention is not limited to the following embodiments <Embodiments/Comparative Examples of the Manufacturing Process of Disc Brake Pad>

The raw material composition for the frictional material, as shown in the following Tables, (Embodiments 1-10: TABLE 1, Comparative Examples 1-9: TABLE 2) is mixed for about 10 minutes by a Loedige Mixer, and the resultant mixture is placed in a pre-forming die to be pre-formed by pressurizing at 35 MPa for 1 minute. This pre-formed product and the steel back plate, which is pre-cleaned, surface treated, and has adhesive applied thereon, are superposed and are placed in a heat-forming metal die and are heated at the forming temperature of 155 degrees C. and pressurized at a forming pressure of 40 MPa for 5 minutes, heat-treated (postcured) in a heat treatment chamber at 200 degrees C. for 4 hours, coated, baked, and grinded to form the brake pad for automotives in the Embodiments and the Comparative Examples.

TABLE 1

| | Embodiments | E 1 | E 2 | E 3 | E 4 | E 5 | E 6 | E 7 | E 8 | E 9 | E 10 |
|---|---|---|---|---|---|---|---|---|---|---|---|
| Fiber Base | Brass Fiber | 7 | 7 | 7 | 7 | 7 | 7 | 7 | 7 | 7 | 7 |
| | Aramid Fiber | 3 | 3 | 3 | 3 | 3 | 3 | 3 | 3 | 3 | 3 |
| Binder | Aralkyl Modified Phenolic Resin | 4 | 4 | 4 | 4 | 4 | 6 | 4 | 4 | 4 | 4 |
| | Phenolic Resin (Weight Average Molecular Weight 3,000) | 2 | 2 | 2 | | 2 | | 2 | 2 | 2 | 2 |
| | Phenolic Resin (Weight Average Molecular Weight 6,000) | | | | 2 | | | | | | |
| Abrasive Material | Zirconium Silicate (Average Particle diameter 8 μm) | | | | | | | | | | |
| | Zirconium Silicate (Average Particle diameter 10 μm) | | 2 | | | | | | | | |
| | Zirconium Silicate (Average Particle diameter 100 μm) | 2 | | 2 | 2 | 2 | | 2 | 2 | 2 | 2 |
| | Zirconium Silicate (Average Particle diameter 200 μm) | | | | | | 2 | | | | |
| | Zirconium Silicate (Average Particle diameter 250 μm) | | | | | | | | | | |
| | Silicon Carbide (Average Particle diameter 10 μm) | | | | | | | | | | |
| Lubricant | Graphite | 5 | 5 | 5 | 5 | 5 | 5 | 5 | 5 | 5 | 5 |
| | Tin Disulfide | 3 | 3 | 3 | 3 | 3 | 3 | 3 | 3 | 3 | 3 |
| Inorganic Filler | Zirconia Oxide (Average Particle diameter 5 μm) | 18 | 18 | 18 | 18 | 18 | 18 | 28 | 8 | 20 | 16 |
| | Triiron Tetroxide | 3 | 3 | 3 | 3 | 3 | 3 | 3 | 3 | 3 | 3 |
| | Mica | 10 | 10 | 10 | 10 | 10 | 10 | 10 | 10 | 10 | 10 |
| | Calcium Hydroxide | 2 | 2 | 2 | 2 | 2 | 2 | 2 | 2 | 2 | 2 |
| | Potassium Titanate | 25 | 25 | | 25 | 25 | 25 | 15 | 35 | 25 | 25 |
| | Potassium Magnesium Titanate | | | 25 | | | | | | | |
| | Barium Sulfate | 12 | 12 | 12 | 12 | 12 | 12 | 12 | 12 | 12 | 12 |
| Organic Filler | Cashew Dust | 4 | 4 | 4 | 4 | 4 | 4 | 4 | 4 | 2 | 6 |
| TOTAL | | 100 | 100 | 100 | 100 | 100 | 100 | 100 | 100 | 100 | 100 |
| Evaluation | Sticking | ◎ | ◎ | ◎ | ◎ | ○ | ◎ | ○ | ◎ | ○ | ◎ |
| | Fading Resistance | ○ | ◎ | ◎ | ◎ | ◎ | ◎ | ◎ | ◎ | ◎ | ○ |
| | Wear Resistance | ◎ | ◎ | ◎ | ◎ | ◎ | ◎ | ◎ | ○ | ◎ | ◎ |
| | Formability | ◎ | ◎ | ◎ | ○ | ◎ | Δ | ◎ | ◎ | ◎ | ◎ |

TABLE 2

| | Comparative Examples | C 1 | C 2 | C 3 | C 4 | C 5 | C 6 | C 7 | C 8 | C 9 |
|---|---|---|---|---|---|---|---|---|---|---|
| Fiber | Brass Fiber | 7 | 7 | 7 | 7 | 7 | 7 | 7 | 7 | 7 |
| Base | Aramid Fiber | 3 | 3 | 3 | 3 | 3 | 3 | 3 | 3 | 3 |
| Binder | Aralkyl Modified Phenolic Resin | 3 | 5 | 8 | 4 | 2 | 4 | 4 | 4 | 4 |
| | Phenolic Resin (Weight Average Molecular Weight 3,000) | 1 | 3 | | 2 | 4 | 2 | 2 | 2 | 2 |
| | Phenolic Resin (Weight Average Molecular Weight 6,000) | | | | | | | | | |
| Abrasive Material | Zirconium Silicate (Average Particle diameter 8 μm) | | | | 2 | | | | | |
| | Zirconium Silicate (Average Particle diameter 10 μm) | | | | | | | | | |
| | Zirconium Silicate (Average Particle diameter 100 μm) | 2 | 2 | 2 | | 2 | | | 0.5 | 4 |
| | Zirconium Silicate (Average Particle diameter 200 μm) | | | | | | | | | |
| | Zirconium Silicate (Average Particle diameter 250 μm) | | | | | | 2 | | | |
| | Silicon Carbide (Average Particle diameter 10 μm) | | | | | | | 2 | | |
| Lubricant | Graphite | 5 | 5 | 5 | 5 | 5 | 5 | 5 | 5 | 5 |
| | Tin Disulfide | 3 | 3 | 3 | 3 | 3 | 3 | 3 | 3 | 3 |
| Inorganic Filler | Zirconia Oxide (Average Particle diameter 5 μm) | 20 | 16 | 16 | 18 | 18 | 18 | 18 | 19.5 | 16 |
| | Triiron Tetroxide | 3 | 3 | 3 | 3 | 3 | 3 | 3 | 3 | 3 |
| | Mica | 10 | 10 | 10 | 10 | 10 | 10 | 10 | 10 | 10 |
| | Calcium Hydroxide | 2 | 2 | 2 | 2 | 2 | 2 | 2 | 2 | 2 |
| | Potassium Titanate | 25 | 25 | 25 | 25 | 25 | 25 | 25 | 25 | 25 |
| | Potassium Magnesium Titanate | | | | | | | | | |
| | Barium Sulfate | 12 | 12 | 12 | 12 | 12 | 12 | 12 | 12 | 12 |
| Organic Filler | Cashew Dust | 4 | 4 | 4 | 4 | 4 | 4 | 4 | 4 | 4 |
| TOTAL | | 100 | 100 | 100 | 100 | 100 | 100 | 100 | 100 | 100 |
| Evaluation | Sticking | ◎ | ○ | — | ◎ | X | X | X | ◎ | X |
| | Fading Resistance | ◎ | X | — | X | Δ | ◎ | ◎ | X | ◎ |
| | Wear Resistance | X | ◎ | — | ◎ | ○ | ○ | Δ | ◎ | ○ |
| | Formability | ○ | ◎ | X | ◎ | ◎ | ◎ | ◎ | ◎ | ◎ |

In regards to the disc brake pads of the embodiments and the comparative examples, sticking, fading resistance, wear resistance, and formability are tested and evaluated. The evaluation methods and the result of the evaluation are shown in TABLES 3 and 4.

TABLE 3

| Evaluation Items | Sticking | Fading Resistance |
|---|---|---|
| Evaluation Method | Standard: JASO C406 | |
| | Auto Motor Und Sport (German Automotive Journal) | |
| | High Speed | |
| | Pattern Testing | |
| | 160 km/h → 70 km/h (deceleration 0.5 g) × 9 times | |
| | 160 km/h → 0 km/h (deceleration 1.0 g) × 9 times | |
| | Maintain 3 seconds at 15 MPa | |
| | (Surface area of the friction material stick on the disc rotor surface)/(Frictional area of the friction material) × 100 | Minimum value of average μ at the final braking |
| ◎ | Less than 1% | 0.25 or more |
| ○ | 1% or more but less than 5% | Less than 0.25 but 0.23 or more |
| Δ | 5% or more but less than 20% | Less than 0.23 but 0.21 or more |
| X | 20% or more | Less than 0.21 |

TABLE 4

| Evaluation Item | Wear Resistance | Formability |
|---|---|---|
| Evaluation Method | Standard: JASO C427 Temperature specific Friction Test Temperature before braking: 100 centigrade Number of braking: 1000 times | Visual measuring of wrinkle and cracking and caliper measuring of wrinkle after formation |
| ◎ | Less than 0.1 mm | No wrinkle and cracking |
| ○ | 0.1 mm or more but less than 0.2 mm | Wrinkle less than 15 mm but no cracking |
| Δ | 0.2 mm or more but less than 0.3 mm | Wrinkle of 15 mm or more but no cracking |
| X | 0.3 mm or more | Wrinkle of 15 mm or more and cracking |

According to the results in TABLES 1 and 2, when the amount of binder, the aralkyl modified phenolic resin content, Moh's hardness, average particle diameter and content of inorganic particles used as abrasive material to be blended, are within the scope of this invention, highly effective results are shown in respect to the sticking problem, fading resistance, wear resistance, and formability.

As discussed above, this invention can provide the brake pad that effectively prevents the sticking problem and offers excellent fading resistance, wear resistance, and formability. Therefore, this invention provides for downsizing of the brake components and also provides for a lighter weight component, resulting in improved vehicle fuel efficiency and operability, thereby providing highly practical disc brake pads.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

EXPLANATION OF THE REFERENCE NUMBERS

1. disc brake pad, 2. back plate, 3. friction material

What we claim is:

1. A disc brake pad for a disc brake, equipped with a ferrous disc rotor, having a friction material comprised of:
    (A) a fiber base material,
    (B) a binder of 4.5-7.0 weight % relative to the gross friction material amount including aralkyl modified phenolic resin of 50-80 weight % relative to the gross amount of the binder, and 2,000-5,000 weight average molecular weight of phenolic resin except said aralkyl modified phenolic resin as a remainder of the binder,
    (C) an abrasive material including inorganic particles of 1-3 weight % relative to the gross friction material amount, where said inorganic particles have Moh's hardness between 6 and 8 and average particle diameter of 10-200 μm, and
    (D) a frictional wear modifier.

2. The disc brake pad of claim 1, wherein the friction material further comprises alkali metal titanate and/or alkali earth metal titanate of 20-30 weight % relative to the gross friction material amount.

3. The disc brake pad of claim 1, wherein the friction material further comprises cashew dusts of 3-5 weight % relative to the gross friction material amount.

4. The disc brake pad of claim 2, wherein the friction material further comprises cashew dusts of 3-5 weight % relative to the gross friction material amount.

* * * * *